United States Patent Office 3,213,804
Patented Oct. 26, 1965

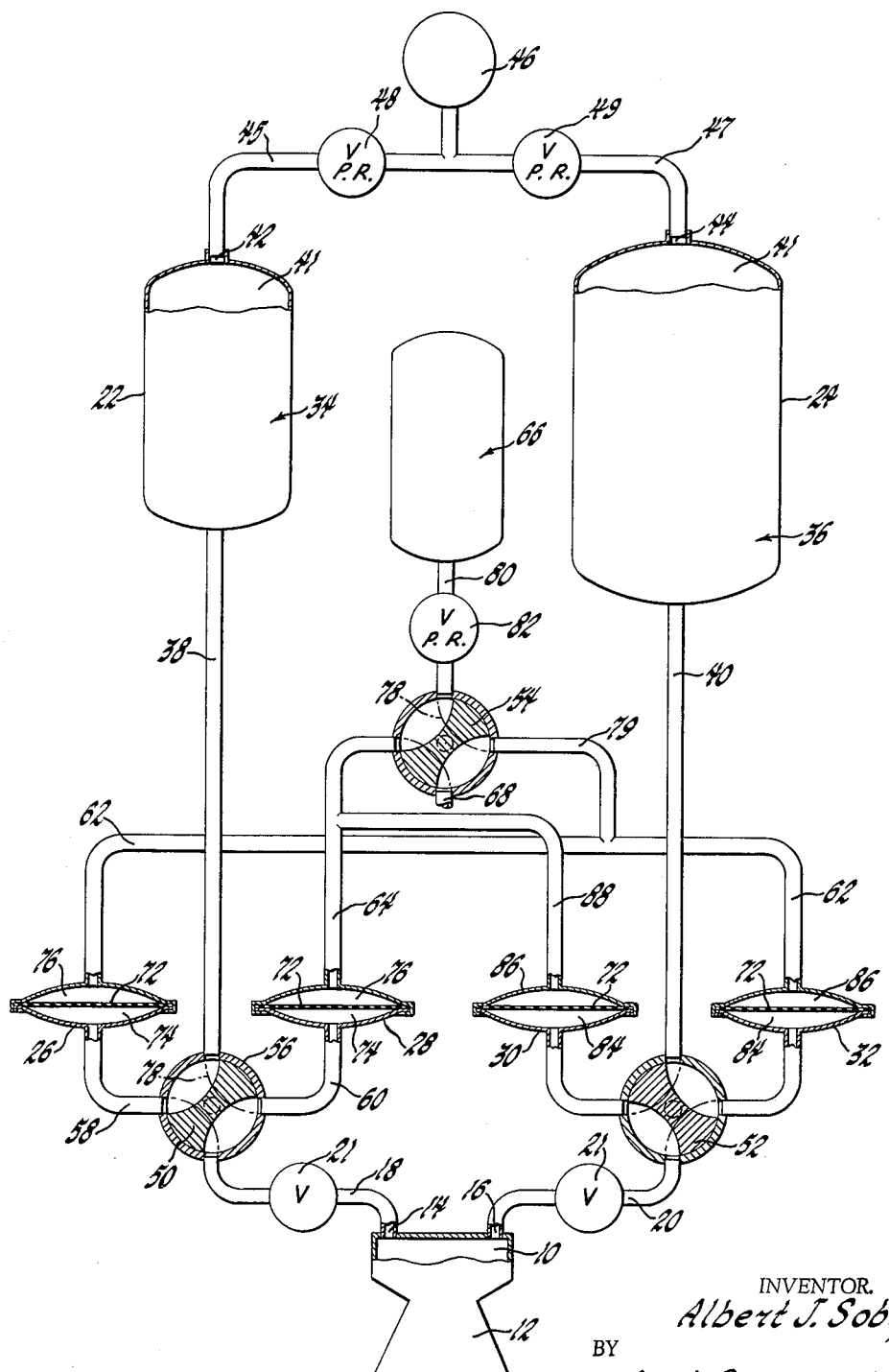

3,213,804
FLUID PRESSURIZING SYSTEM
Albert J. Sobey, Indianapolis, Ind., assignor to General Motors Corporation, Detroit, Mich., a corporation of Delaware
Filed Dec. 28, 1961, Ser. No. 162,677
4 Claims. (Cl. 103—152)

This invention relates to a fluid pressurizing system. More particularly, it relates to a system and apparatus for injecting a fluid into a collector at a high presssure while maintaining the tank in which the fluid is stored at a relatively low pressure. The invention is particularly applicable to a rocket motor fuel pressurizing system, although, as will appear later, it will have uses in many other installations.

Most chemical liquid propellant rocket motors carry separate tanks for storage of the liquid fuel and oxidizer, and, in many cases, these tanks must have thick and heavy walls so as to enable them to withstand the forces of the high pressure liquids stored in them. This is undesirable since any additional weight to the motor results in a thrust loss.

Therefore, it is an object of this invention to provide a fluid pressure system and apparatus effecting the injection of a fluid into a collector at a high pressure while permitting the fluid to be stored at a relatively low pressure, thereby enabling the use of thin-walled, lightweight storage tanks.

It is a further object of the invention to provide an apparatus for pressurizing the fluids contained in a plurality of low pressure tanks, the apparatus consisting of a number of fluid pressure accumulators receiving the low pressure fluid which is subsequently displaced by a higher pressure fluid and forced into a collection chamber at an intermediate pressure.

Other objects, features and advantages will became apparent upon reference to the succeeding detailed description of the invention and to the drawing wherein the figure illustrates schematically a fluid pressure system and apparatus embodying the invention.

The invention in general is concerned with a rocket motor fuel pressurizing system wherein the liquid fuel and oxidizer in low pressure tanks are each discharged into accumulators to be subsequently displaced by a higher pressure gas forcing the liquid into the combustion chamber at an intermediate pressure level. A number of reversible valves control the flow to and from the accumulators in a manner such that as the fuel and oxidizer are supplied to empty accumulators, previously filled ones discharge their liquids into the combustion chamber at an increased pressure. Reversing the positions of the valves reverses the process so that there is substantially a continuous flow of fuel and oxidizer into the chamber.

More specifically, the figure shows a fuel pressurizing system for a rocket motor having an annular combustion chamber 10 integrally connected to an exhaust nozzle 12. The nozzle is of a known convergent-divergent type adapted to compress, accelerate and eject the gases generated in the combustion chamber by the chemical reaction between the liquid fuel and oxidizer supplied thereto.

The combustion chamber has two metered inlet openings 14 and 16 in which are fitted the ends of fuel and oxidizer supply lines 18 and 20 each having a valve 21. The valves 21 initially prevent flow to the combustion chamber below a predetermined pressure level, and could contain diaphragms, for example, that burst upon activation of the system at a pressure commensurate with that to be maintained in the combustion chamber. Although not shown, the inlets would normally contain metering nozzles to control the injection of the liquids into the chamber according to a predetermined schedule, and the nozzle throat would be of a size to maintain the combustion chamber at an operating pressure level of say 300 p.s.i.a., for example.

Supply lines 18 and 20 are connected to two liquid fuel and oxidizer storage tanks 22 and 24, each of which has two accumulators 26, 28 and 30, 32 connected in parallel to its line to increase the pressure of the fuel and oxidizer to the combustion chamber operating pressure level. Each of the tanks is of a similar construction, being a thin walled, lightweight vessel of an appropriate size. They are filled with fuel 34 or oxidizer 36 to the desired level through openings not shown, and are open at one end to discharge the liquids into lines 38 and 40. Both the fuel and oxidizer in the tanks are pressurized to a low level, say 50 p.s.i., for example, by a gas 41 admitted into the top of each tank through openings 42 and 44. The gas in this particular instance is nitrogen although it will be clear that other pressurizing mediums could be used without departing from the scope of the invention. The gas is contained in a bottle or other suitable vessel 46 and connected to the tanks through lines 45 and 47 and suitable pressure regulator valves 48 and 49.

The flow of fuel and oxidizer from lines 38 and 40 to and from the accumulators to the combustion chamber 10 is controlled by two reversing valves 50 and 52 and a third similar valve 54 controlling the high pressure gas supply. Since the fuel and oxidizer are pressurized subsantially independently of each other for separate delivery into the combustion chamber, and since the apparatuses for accomplishing this are substantially identical, only one will be described in detail.

The valve 50 is of a known butterfly type having double concave surfaces in cross section and rotating in a valve body 56 having a circular cross section. The valve body has four openings ninety degrees apart in which are fitted the ends of lines 38 and 18, as well as the ends of two lines 58 and 60 connected respectively to one side of accumulators 26 and 28. The opposite sides of the accumulators are adapted to be connected by lines 62 and 64 either to a high pressure gas source 66 or to be vented to the atmosphere through line 68. Rotary valve 54 is of the same construction as valve 50 and provides the control between these alternate paths. Each of the accumulators is of a known type being substantially oval in cross section and having a flexible diaphragm or bladder 72 dividing it into two fluid pressure chambers 74 and 76.

Valves 50 and 54 are connected so as to rotate substantially together in a manner to be described and move between the positions shown in full lines and that indicated by dotted lines 78. The details of this construction are not shown since they may be conventional and are believed to be unnecessary for an understanding of the invention. They may be connected by suitable linkage, for example. In the full line positions of the valves, the fuel is supplied to chamber 74 of accumulator 26 at 50 p.s.i. to fill it, the opposite chamber 76 being vented to the atmosphere through line 62 and a branch line 79, valve 54 and line 68. Simultaneously, high pressure gas at approximately 400 p.s.i. is admitted to chamber 76 of accumulator 28 through valve 54 and line 64 to displace any low pressure fluid that may be in the opposite chamber 74 and force it into the rocket combustion chamber 10 through line 18 at an increased pressure.

The high pressure gas may be obtained by the use of known types of gas generators, such as, for example, a solid propellant charge consisting of a mixture of an oxidizer in a fuel matrix and containing a pyrotechnic igniter. The line 80 leading from the gas source 66 to valve 54 would contain a pressure regulator valve 82 to maintain the gas pressure at a safe level and at a level to insure that the liquids would be injected into the combustion chamber at the proper pressure, which is 300 p.s.i.a., in this case. Movement of the valves 50 and 54 to their dotted line positions 78 reverses the connections previously made so that chamber 76 of accumulator 26 is connected to the high pressure gas source, chamber 74 is connected to the combustion chamber supply line 18, chamber 74 of accumulator 28 is connected to be supplied with fuel through line 34, and its opposite chamber 76 is vented through lines 64 and 68.

Thus, the low pressure fuel in accumulator 26 is displaced by the high pressure gas and forced into the combustion chamber at its operating pressure level of approximately 300 p.s.i. Simultaneously, the accumulator 28 is filled with fuel so as to be in a condition to eject the fuel into the combustion chamber as soon as the valves 50 and 54 rotate back to their full line positions.

As stated previously, the pressurizing system for the oxidizer is substantially identical to that for the fuel. The valve 52, similar in construction to and connected to valves 50 and 54 to be rotated therewith, alternatingly supplies oxidizer to chamber 84 on one side of the two bladder type accumulators 30 and 32 in the same manner as the flow of fuel to accumulators 26 and 28. The opposite chamber 86 of accumulator 30 is connected to line 64 by a branch line 88 to either receive high pressure gas or be vented, while chamber 86 of accumulator 32 is connected to lines 62 and 79 for the same purpose.

The drive mechanism and its details for controlling the rotation of the valves between their dotted and full line positions are not shown since they are known and are believed to be unnecessary for an understanding of the invention. For example, a variably driven, cam operated mechanism similar to that shown in United States application Serial Number 855,830, Self Cleaning Filter System, by Robert J. Wente, filed November 27, 1959, now abandoned, relating to a mechanism for rotating the control valves therein, could be used without departing from the scope of the invention. Suffice it to say, however, that in the present instance, the valves 50, 52 and 54 would be of the quick throw type rotated rapidly to their alternate positions so that there would be substantially no time interval in which fuel or oxidizer is not supplied to the combustion chamber. However, the timing would be such that the gas control valve 54 would be rotated slightly in advance of the movement of valves 50 and 52. This is done to start a build up in the pressure in the vented accumulator chambers slightly in advance of the movement of valves 50 and 52 to assure that the fuel and oxidizer will be immediately and smoothly ejected into lines 18 and 20 as soon as the valves are rotated, thereby substantially eliminating a break in flow and eliminating pulsations. Also, the advance movement of valve 54 will start to decay the gas pressure in those accumulators from which the fuel and oxidized are being ejected before movement of the valves 50 and 52. In other words, as the last drops of fuel and oxidizer enter lines 18 and 20 from accumulators 26 and 32, for example, the first drops of fuel and oxidizer from accumulators 28 and 30 are ready to follow without pulsations.

Turning now to the overall operation of the system, initially the valves are in the positions shown, there is no gas pressure in line 80, valves 21 are closed, and chambers 74 and 84 of accumulators 26 and 32 are filled with fuel and oxidizer bottoming their bladders 72. The opposite chambers 76 and 86 are connected to vent line 68, while chambers 74 and 84 of accumulators 28 and 30 are empty. To commence operation, therefore, the solid propellant 66 is ignited generating a gas in line 80 at 400 p.s.i., for example, as controlled by valve 82. This gas is then admitted to chambers 76 and 86 of accumulators 28 and 30, but since there is no fuel or oxidizer in the opposite chambers 76 and 86, nothing happens.

After a suitable time lapse as determined by the actuating mechanism, not shown, which would be about the time the bladders 73 of the accumulators would normally approach bottoming, the gas control valve 54 rotates towards its dotted line position slightly in advance of the movement of valves 50 and 52 to begin to supply pressure to chambers 76 and 86 of accumulators 26 and 32, while decaying the pressure in chambers 76 and 86 of accumulators 28 and 30. Valves 50 and 52 then are rotated to their dotted line positions, and immediately, the fuel and oxidizer in chambers 74 and 84 of accumulators 26 and 32 are displaced by the high pressure gas now fully admitted to the opposite chambers, and are injected into the combustion chamber 10 through valves 50 and 52, valves 21, and lines 18 and 20. The diaphragms (not shown) of valves 21 will burst as soon as the pressure level reaches 300 p.s.i.a. During this time, chambers 74 and 84 of accumulators 28 and 30 are filling with fuel and oxidizer at 50 p.s.i.a., the opposite chambers 76 and 86 being vented through lines 64 and 68. This valve reversing sequence continues smoothly and automatically with the valves 50 and 52 lagging slightly behind the movement of valve 54 until all of the fuel and oxidizer has been injected into the combustion chamber.

From the foregoing, therefore, it will be seen that the invention provides a reliable liquid pressurizing system raising the pressure of the liquids to a desired level while maintaining the tank pressure relatively low.

While the invention has been shown in its preferred embodiment for use in connection with a rocket motor, it will be clear to those skilled in the arts to which the invention pertains that it would have many other uses than that illustrated and that changes and modifications may be made thereto without departing from the scope of the invention.

I claim:

1. A fluid pressurizing system comprising sources of low and high pressure fluids, means defining a fluid collection chamber having a controlled fluid inlet, conduit means connecting said low pressure source and chamber inlet, and control means in said conduit means between said low pressure source and chamber and connected to said high pressure source, said control means including a vent line, a fluid pressure accumulator receiving a portion of the low pressure fluid therein for displacement by said high pressure fluid into said chamber at an intermediate pressure and also including flow directional means movable to one position filling said accumulator with low pressure fluid while releasing said high pressure fluid through said vent line thereby blocking the flow of fluid to said chamber and movable to another position unblocking the high pressure fluid flow to said accumulator by closing said vent line and allowing the flow to said chamber while blocking the supply of low pressure fluid to the accumulator.

2. A fluid pressurizing system comprising separate sources of low and high pressure fluids, a fluid vent line, means defining a fluid collecting chamber having a restricted fluid inlet, and a fluid pressure increasing means between said sources and vent line and chamber inlet, first conduit means connecting said low pressure fluid to said chamber inlet and to one portion of said pressure increasing means, second conduit means connecting said high pressure source to said vent line and to another portion of said pressure increasing means to at times act against the low pressure fluid therein, and control means in each of said first and second conduit means movable between positions controlling the distribution of fluid through said conduit means, said control means in one position connecting said low pressure fluid to one portion of said pressure increasing means and connecting the other portion of said latter means to said vent line while blocking both the conduit means to said high pressure source and to said chamber inlet, the movement of said control means to other positions blocking both the conduit means to said vent line and low pressure fluid source while connecting said high pressure fluid to the other portion of said pressure increasing means and connecting the low pressure fluid in said one portion to said chamber inlet so that the high pressure fluid displaces said low pressure fluid forcing it into said chamber at an intermediate pressure level.

3. A fluid pressurizing system comprising separate sources of low and high pressure fluids, a fluid vent line, means defining a fluid collecting chamber having a restricted fluid inlet, and a fluid pressure accumulator between said sources and vent line and chamber inlet, first conduit means connecting said low pressure fluid to said chamber inlet and to one side of said accumulator, second conduit means connecting said high pressure source to the opposite side of said accumulator to at times act against the low pressure fluid therein and connecting said opposite side to said vent line, and reversible valve means in each of said first and second conduit means movable between positions controlling the distribution of fluid through said conduit means, said valve means in one position connecting said low pressure fluid to said one side of said accumulator and the other side to said vent line while blocking both the conduit means to said high pressure source and to said chamber inlet, the movement of said valve means to other positions blocking the conduit means to said vent line and low pressure fluid source while connecting said high pressure fluid to the other side of said accumulator and connecting the low pressure fluid in said one side to said chamber inlet so that the high pressure fluid displaces said low pressure fluid forcing it into said chamber at an intermediate pressure level.

4. A fluid pressurizing system comprising a thin-walled tank containing a fluid at a low pressure, means defining a fluid collecting chamber having a metered inlet, a source of high pressure fluid, first and second fluid pressure accumulators, and conduit means connecting the fluid in said tank to said inlet through said accumulators for substantially continuous delivery into said chamber at a pressure between said low and high pressures, said conduit means including connecting means connecting said high and low pressure fluids to opposite sides of each of said accumulators, and reversible valve means including a vent line connected to said reversible valve means in said connecting means movable between positions controlling the flow of the fluids to and from said accumulators to said chamber inlet and vent line, said valve means in one position connecting the fluid from said tank to one side of said first accumulator while connecting the opposite side to said vent lines, and connecting the one side of said second accumulator to said chamber inlet while connecting the opposite side to said high pressure fluid source, the reversing of said valve means connecting the high pressure fluid to the opposite side of said first accumulator and its one side to said chamber inlet to force said low pressure fluid into said chamber inlet at an intermediate pressure, and connecting the opposite side of said second accumulator to said vent line while connecting its one side to the fluid in said tank to condition the second accumulator such that this fluid from said tank is ready to be displaced from said one side of said second accumulator into said chamber inlet by the high pressure fluid entering the opposite side of said accumulator upon a further reversing of said valve means.

References Cited by the Examiner
UNITED STATES PATENTS

| | | | |
|---|---|---|---|
| 629,194 | 7/99 | Knell | 230—30 |
| 2,673,525 | 3/54 | Lucas | 103—152 |

LAURENCE V. EFNER, *Primary Examiner.*

WARREN E. COLEMAN, *Examiner.*

UNITED STATES PATENT OFFICE
CERTIFICATE OF CORRECTION

Patent No. 3,213,804            October 26, 1965

Albert J. Sobey

It is hereby certified that error appears in the above numbered patent requiring correction and that the said Letters Patent should read as corrected below.

Column 1, line 36, for "became" read -- become --; column 2, lines 27 and 28, for "subsantially" read -- substantially --; column 3, line 53, for "oxidized" read -- oxidizer --; line 74, for "73" read -- 72 --; column 6, line 11, for "lines" read -- line --.

Signed and sealed this 19th day of July 1966.

(SEAL)
Attest:

ERNEST W. SWIDER
Attesting Officer

EDWARD J. BRENNER
Commissioner of Patents